UNITED STATES PATENT OFFICE.

F. G. RIETSCH, OF RUDOLETZ, MORAVIA, AUSTRIA.

IMPROVEMENT IN CONCENTRATED BEER MATERIAL.

Specification forming part of Letters Patent No. 8,708, dated February 3, 1852.

*To all whom it may concern:*

Be it known that I, FRANZ G. RIETSCH, of Bohemian Rudoletz, in Moravia, a citizen of the Imperial States of Austria, have invented or produced a new and useful preparation of matter, termed by me "Zeilithoid" or "Grain-Stone;" and I do hereby declare that the following is a full, clear, and exact description of my said invention and of the manner of making, compounding, and using the same.

Zeilithoid is the solid vegetable substance which remains after evaporating a decoction or infusion in water of malted or unmalted grain which has undergone saccharine fermentation. This substance is composed of gum, starch, and sugar, with a small quantity of other matters, and presents a resinous structure and appearance.

Zeilithoid may be conveniently prepared from the saccharine liquor commonly called "worts," which is the extract prepared from grain by brewers and distillers by the well-known process called "mashing," care being taken to arrest the fermentation before it has assumed a vinous character. The worts or saccharine liquor shall be separated from the grain by decantation and pressure, or otherwise, and the water evaporated from it until it becomes thick or viscid, and will solidify on cooling. The viscid mass may be formed into cakes or blocks of any convenient size and shape by pouring it into molds previous to cooing.

The zeilithoid thus prepared is but little affected by the action of the atmosphere, and may therefore be easily kept for a great length of time in any climate.

Substances more easily affected by the action of the atmosphere and changes of temperature—such, for example, as hops and yeast—may be preserved by mixing them with or incasing them in the zeilithoid.

The aroma and bitter principle of hops may be preserved in the zeilithoid, either by infusing them in the worts or by pulverizing them and incorporating them with the viscid mass previous to molding and cooling.

Yeast may be preserved by mixing it with the zeilithoid after the evaporation is completed and the mass is ready to mold.

In mixing the above-mentioned or other substances with the zeilithoid to preserve them, care must be taken to avoid the addition of too much of either dry or liquid matter, as the former would render the mass spongy and liable to absorb moisture from the atmosphere, which would prevent its keeping, while the latter would prevent it from solidifying. The evaporation of the worts may be accelerated by agitation, and care will be necessary to avoid burning it, unless a vacuum-pan heated by steam be used, which is recommended for the purpose.

Zeilithoid may be used for various purposes in the arts; but I propose to employ it mainly as the basis of fermented and unfermented beverages. For unfermented beverages it is simply necessary to dissolve it in water; but for fermented beverages it must be dissolved in water to reproduce a worts similar to that from which it was produced by evaporation, and if the yeast-zeilithoid be not used, then yeast must be added to produce fermentation, which must be managed as in brewing, and the result will be the production of beer which, if made from zeilithoid produced from malt and flavored with hops, will not differ materially from ale or beer or porter, according as the malt and hops were in quality, proportions, and quantity adapted to the production of one or the other of these beverages. Since the flavor and character of these liquors will depend upon the quality and flavor of the zeilithoid, which, in turn, depends for these properties upon the materials of which it is made, it follows that the flavor and quality of the beer can be varied to suit different tastes by varying the materials of which the worts is made, precisely as in the manufacture of beer in the ordinary way.

The yeast-zeilithoid can be used for the production of yeast for bread-making, or to induce fermentation for any other purpose in warm climates, on shipboard, or elsewhere where ordinary yeast is not readily obtainable.

What I claim as my invention, and desire to secure by Letters Patent, is—

The new and useful preparation of matter herein described, termed "zeilithoid."

London, 22d of July, 1851.

FRANZ G. RIETSCH.

Witnesses:
G. PRINCE LÖWENSTEIN,
LIO COUNTS RAZUMOOSKY.